United States Patent [19]

Takahashi et al.

[11] Patent Number: 5,043,862
[45] Date of Patent: Aug. 27, 1991

[54] METHOD AND APPARATUS OF AUTOMATICALLY SETTING PID CONSTANTS

[75] Inventors: Susumu Takahashi, Ibaraki; Kouji Tachibana, Katsuta; Tadayoshi Saito, Hitachiota, all of Japan

[73] Assignee: Hitachi, Ltd., Tokyo, Japan

[21] Appl. No.: 333,978

[22] Filed: Apr. 6, 1989

[30] Foreign Application Priority Data

Apr. 7, 1988 [JP] Japan ................................. 63-84037

[51] Int. Cl.$^5$ ............................................ G05B 13/02
[52] U.S. Cl. .................................... 364/162; 364/148; 364/513
[58] Field of Search ............... 364/148, 157, 158, 160, 364/162, 178, 179, 513; 318/561

[56] References Cited

U.S. PATENT DOCUMENTS

| 4,539,633 | 9/1985 | Shigemasa et al. | 364/162 |
| 4,602,326 | 7/1986 | Kraus | 364/158 |
| 4,755,924 | 7/1988 | Hiroi | 364/148 |
| 4,864,490 | 9/1989 | Nomoto et al. | 364/157 |
| 4,882,526 | 11/1989 | Iino et al. | 318/561 |
| 4,903,192 | 2/1990 | Saito et al. | 364/157 |
| 4,983,898 | 1/1991 | Kanda | 318/561 |

FOREIGN PATENT DOCUMENTS 61-290505 12/1986 Japan .
62-9404 1/1987 Japan .
62-241003 10/1987 Japan .

OTHER PUBLICATIONS

"Application of Fuzzy Algorithms for Control of Simple Dynamic Plant", E. H. Mandani, Proc. IEEE, vol. 121, No. 12, Dec. 74.

Primary Examiner—Jerry Smith
Assistant Examiner—Paul Gordon
Attorney, Agent, or Firm—Antonelli, Terry, Stout & Kraus

[57] ABSTRACT

PID control method and PID controller for determining, from a control response from a process, characteristic values representative of controllability and automatically deriving and setting PID constants from the determined characteristic values. The error between a set point and a controlled value is decided as to whether to be due to a change in set point or due to a disturbance, and PID constants are set on the basis of results of decision.

27 Claims, 8 Drawing Sheets

FIG. 3

| SET POINT CHANGE MODE | | | | | APPLIED DISTURBANCE MODE | | | | | |
|---|---|---|---|---|---|---|---|---|---|---|
| CONDITIONAL PART | | CONCLUSION PART | | | CONDITIONAL PART | | | CONCLUSION PART | | |
| OV | DP | SR | CPR | CTI | CTD | OV | DP | DR | CPR | CTI | CTD |
| PB | PB | PB | UP | UP | DW | PB | PB | PB | UP | UP | DW |
| PB | PM | PB | UP | DW | NC | PB | PM | PB | UP | NC | NC |
| NB | PM | NB | NC | DW | DW | NB | ZO | NB | NC | UP | NC |

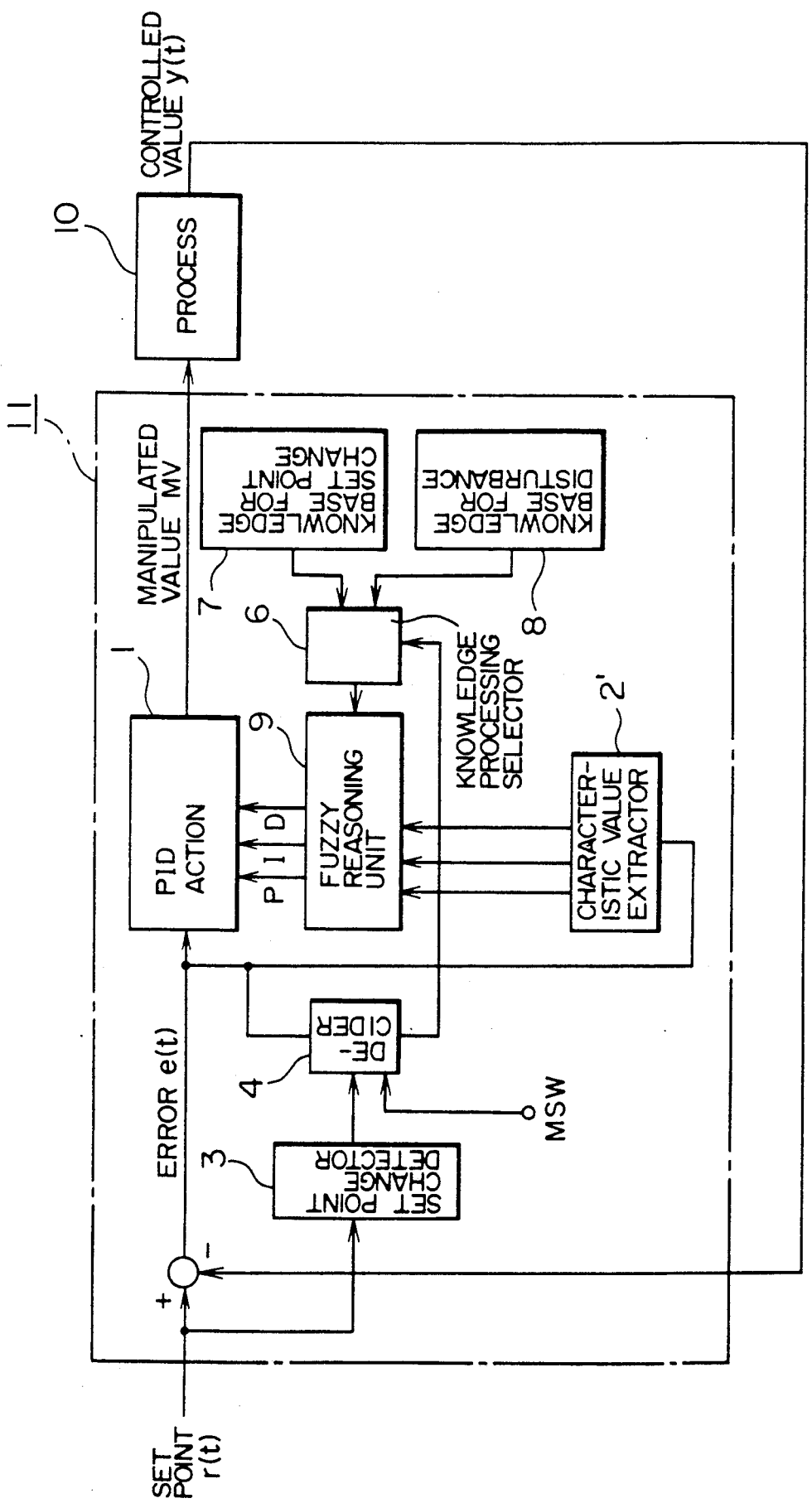

METHOD AND APPARATUS OF AUTOMATICALLY SETTING PID CONSTANTS

BACKGROUND OF THE INVENTION

This invention relates to a method and apparatus of automatically setting PID (proportional plus integral plus derivation) constants used for process control and more particularly to a method and apparatus for auto-tuning (automatic adjustment of constants) PID control suitable for automatically setting, on the basis of a control response from a process, PID constants which can rapidly settle the control response in accordance with a change in set point and a disturbance applied.

In PID control systems, the setting of PID constants has hitherto been done on the basis of a "rule of thumb" obtained from experience of skilled control engineers. In such a manual setting, however, the engineer is required to conduct tuning of PID constants each time start-up of a process is initiated or a change is introduced into process characteristics. With a view of eliminating such troublesome labor, a PID controller has been proposed which possesses the function of auto-tuning PID constants.

The control response characteristic due to the change in set point differs from that due to the applied disturbance and the PID constants for the former factor generally differ from those for the latter factor. When the same PID constants are used for the set-point change and disturbance, it is difficult to perform control for achieving control characteristics effective for both of the set-point change and disturbance, that is, such control as for designating, for example, a damping ratio of 10% and an overshoot amount of 5%. JP-A-62-241003 discloses a prior art auto-tuning PID controller based on fuzzy reasoning which uses a single knowledge base and characteristic values to perform tuning. Disadvantageously, this prior art controller sets PID constants effective for only one of a set-point change and a disturbance and can not settle control response effective for both of the set-point change and the disturbance.

U.S. Pat. application (PID Controller System) Ser. No. 177,428 assigned to the same assignee and filed on Apr. 1, 1988 is also concerned with auto-tuning of PID constants based on fuzzy reasoning.

According to the disclosures of JP-A-61-290505 and JP-A-62-9404, PID constants effective for only one of the set-point change and the disturbance are set and when a disturbance or a change in set point occurs, the PID constants are corrected by a compensation calculation means to PID constants equivalent to an control status which is optimized for suppression of a change due to the occurring factor.

SUMMARY OF THE INVENTION

An object of this invention is to provide a PID-constant automatic setting method and an auto-tuning controller capable of automatically setting PID constants which can rapidly settle control response in accordance with both a change in set point and a disturbance applied to a process.

To accomplish the above object, according to one aspect of the invention, characteristic values representative of controllability for a process are determined on the basis of an error between a set point for the process and a controlled value therefrom, the control response generated at the process is decided as to whether to be due to a change in set point or due to a disturbance applied to the process, and PID constants are determined on the basis of the characteristic values and results of the decision.

According to another aspect of the invention, an auto-tuning PID controller includes means for extracting characteristic values representative of controllability from an error between a set point for a process and a controlled value therefrom, means for deciding whether the control response from the process is due to a change in set point or due to a disturbance applied, and PID-constant determining means for deriving PID constants on the basis of the characteristic values, the determining means including a first determining unit for determining PID constants corresponding to the set-point change, a second determining unit for determining PID constants corresponding to the applied disturbance, and means for selecting either one of the first and second determining units on the basis of results of decision from the deciding means.

BRIEF DESCRIPTION OF THE DRAWINGS

FIG. 3 shows PID control rules for set-point change and applied disturbance.

FIG. 8 is a block diagram illustrating another embodiment of the auto-tuning PID controller.

DESCRIPTION OF THE PEEFERRED EMBODIMENTS

Figure 1:
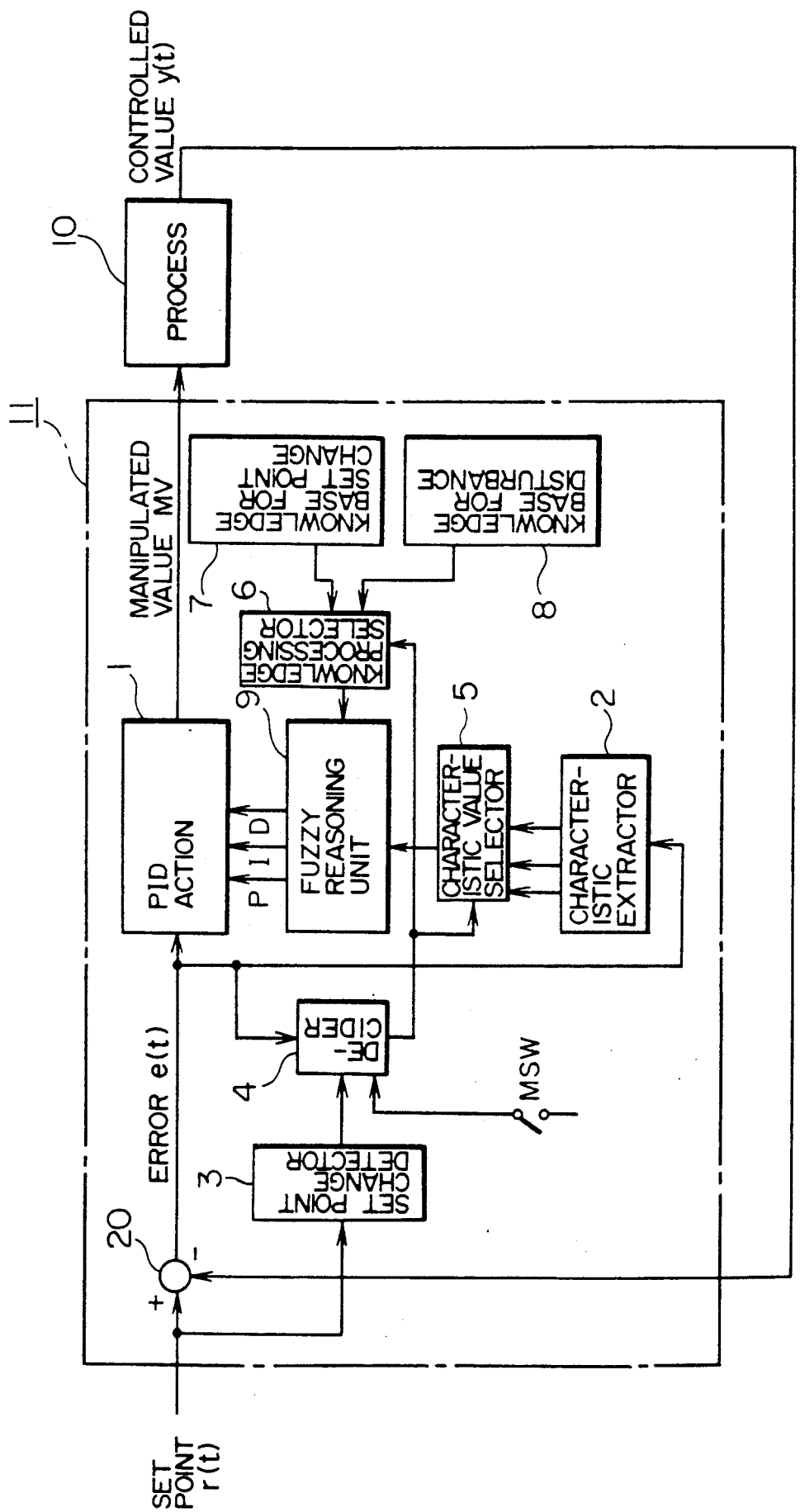
FIG. 1 is a block diagram illustrating an embodiment of an auto-tuning PID controller according to the invention.

Before describing preferred embodiments of the invention, the principle thereof will first be described.

In the prior art disclosed in JP-A-62-241003, tuning of PID constants is performed in the same manner for both a change in set point and a disturbance applied. Occasionally, however, if in PID calculation, controllability responsive to the change in set point is optimized, then controllability responsive to the disturbance will be degraded and conversely if controllability responsive to the disturbance is optimized, then transient response to the change in set point will be degraded. Consequently, there arises a problem that setting of the PID constants can be permitted for only one of the change in preset point and the disturbance response.

The present invention features deciding whether the control response from a process is due to a change in set point or a disturbance, setting PID constants suitable for setting a change due to the change in set point when results of decision indicate the change in set point, and setting PID constants suitable for setting a change due to the disturbance when results of decision indicate the disturbance.

When the control response is known as being due to either one of the change in set point and the disturbance, the PID constants can be adjusted so that the transient response waveform can be improved in response to the occurrence of an error due to the change in set point (i.e., difference between set point and controlled value) and so that the changing characteristic can be improved in response to the occurrence of an error due to not the change in set point but rather the applied disturbance or a change in characteristics of the process, thereby making it possible to set the PID constants suited for both of the responses.

In the present invention, PID constants are preferably derived through fuzzy reasoning. More specifically, a set-point change detector detects a change width of a changed set point, a decider operates to decide whether the set point change width concomitant with the occurrence of an error exceeds a threshold value or not to determine one of the set-point change and a disturbance applied, a knowledge processing selector responds to results of decision to select a knowledge base for the set-point change or for the disturbance, and a characteristic value selector selects characteristic values for the set-point change or for the disturbance. Then, on the basis of the selected knowledge base and characteristic values, a fuzzy reasoning unit derives new PID constants and sets them in a PID action (calculator). In this manner, PID constants suited for either one of the set-point change and disturbance can be set, with no PID constants set for suppression of the disturbance when an error due to the set-point change occurs.

The disturbance interfering with the process is caused by changes in ambient temperature, leakage of liquid raw material, scheduled to be supplied to the process, from the storage tank and the like factor.

The invention will now be described by way of example with reference to the accompanying drawings.

Referring to FIG. 1, there is illustrated, in block form, an embodiment of an auto-tuning PID controller according to the invention. The PID controller generally designated by reference numeral 11 carries a microprocessor and it comprises a PID action 1 for performing a PID calculation which makes a set point and a controlled value for a process 10 coincident with each other, a characteristic value extractor 2 for determining characteristic values on the basis of an error between the set point and the controlled value, a set-point change detector 3 for detecting a change in set point, a decider 4 for deciding one of the set-point change and a disturbance, a characteristic value selector 5 for selecting characteristic values on the basis of the results of decision sent from the decider 4, a knowledge processing selector 6 for selecting a knowledge base, a knowledge base for set-point change 7 and a knowledge base for disturbance 8, each of which contain PID control rules and membership functions which are used for fuzzy reasoning, and a fuzzy reasoning unit 9 for setting PID constants on the basis of a selected knowledge base. The error is generated by a subtractor 20 which subtracts the controlled value from the set point.

The PID action 1 responds to an error e(t) between a set point r(t) and a controlled value y(t) from the process 10 to calculate the following equation (1) having variables of proportional band PR, integration time $T_I$ and differential time $T_D$ and deliver a manipulated value MV:

$$MV = \frac{100}{PR}\left(1 + \frac{1}{T_I S} + \frac{T_D S}{1 + \frac{T_D}{10} \cdot S}\right)e \quad (1)$$

where S is Laplace operator.

The characteristic value extractor 2 extracts characteristic values from a signal waveform of the error e(t).

Figure 2:
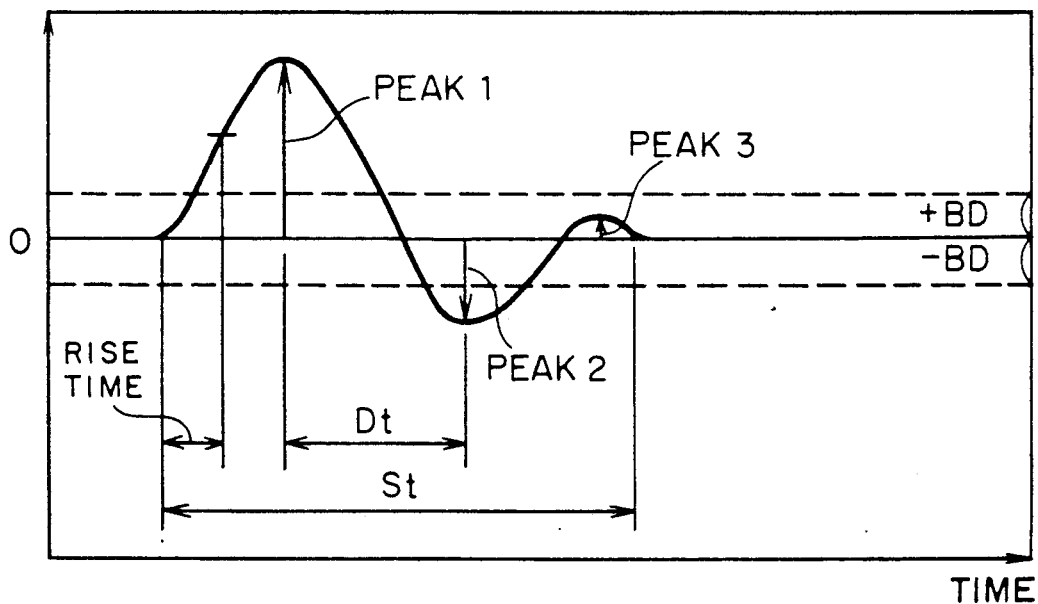
FIG. 2 is a diagram showing an example of waveform of an error signal.

FIG. 2 shows a signal waveform of the error e(t) and characteristic values. Peak values and peak occurrence times are measured in connection with the signal waveform and the characteristic value extractor 2 responds to the measured peak values and peak occurrence times to calculate an overshoot amount OV, an amplitude damping ratio DP, an oscillation period Dt and a settling time St. Subsequently, for the oscillation period Dt, a value determined concomitantly with the occurrence of the previous error is divided by a value currently determined to provide an oscillation period ratio DR and for the settling time St, a previously determined value is divided by a currently determined value to provide a settling time ratio SR. The characteristic values such as an overshoot amount OV, an amplitude damping ratio DP, the oscillation period ratio DR and settling time ratio SR are calculated through the following equations (2), (3), (4) and (5), respectively.

$$OV = PEAK2/PEAK1 \quad (2)$$

$$DP = PEAK3/PEAK2 \quad (3)$$

$$SR = St(N)/St(N-1) \quad (4)$$

$$DR = Dt(N)/Dt(N-1) \quad (5)$$

where
St(N): currently determined settling time
Dt(N): currently determined oscillation period
St(N−1): previously determined settling time
Dt(N−1): previously determined oscillation period.

Essentially, the characteristic values are required to represent the quality of the control response and may additionally include a rise time of the signal waveform of e(t), for example, time required for the value of e(t) to reach 60% of the first peak 1, and the number of peaks (three peaks in the case of the waveform shown in FIG. 2). Detection of the peak of the error signal waveform is started when the absolute value of the error exceeds predetermined values ±BD which have been preset manually in advance. Unless the absolute value exceeds the predetermined values, peak detection is not performed, characteristic values are not calculated and PID constants are not changed.

The set point change detector 3 is responsive to a current set point r(t) to calculate a change width of set point ΔSV in accordance with the following equation:

$$\Delta SV = r(t) - r(t - \Delta t) \quad (6)$$

where
r(t): set point at current detection
r(t−Δt): set point at previous detection which precedes the current detection by sampling period Δt seconds.

The decider 4 first detects a change in amplitude of the error signal e(t) and when the amplitude change exceeds, in absolute value, the predetermined value ±BD, it then decides whether a change occurs in the set-point change width ΔSV. In the presence of the change in ΔSV, the decider 4 delivers a signal for switching the mode, to set-point change mode but in the absence of the change in ΔSV, it delivers a signal for switching the mode to applied disturbance mode.

The decider 4 is connected with an automatic/manual switchover switch MSW which can be set externally of the controller. With the switch MSW is rendered off (or, the logical level "0", for example), an automatic mode is established wherein the change in set point is detected to automatically select the characteristic values and knowledge base for the set point change or those for applied disturbance. With the switch MSW is rendered on, a manual mode is established wherein either one of the set-point change mode and applied disturbance mode can be set externally. This manual mode is used either when PID constants always complying with transient characteristics due to the change in set point suffice or when PID constants always complying with minimization of the influence of the disturbance suffice. Since this manual mode optimizes one of the two characteristics at the sacrifice of the other, it is used only when the sacrificed characteristic does not affect the controlled object adversely. With the automatic mode set, it may also be possible that while maintaining the trade-off between the suppression effect for the disturbance and the transient characteristic due to the change in set point, PID constants are so adjusted as to meet controllability responsive to each of the two factors.

The characteristic value selector 5 responds to the mode switchover signal to select the overshoot amount, amplitude damping ratio and settling time ratio and deliver these characteristic values during the set-point change mode, and to select the overshoot amount, amplitude damping ratio and oscillation period ratio and deliver these characteristic values during the applied disturbance mode. In an alternative, the characteristic value selector may be merged into a characteristic value extractor 2 which can determine (extract) and select characteristic values.

Figure 4:
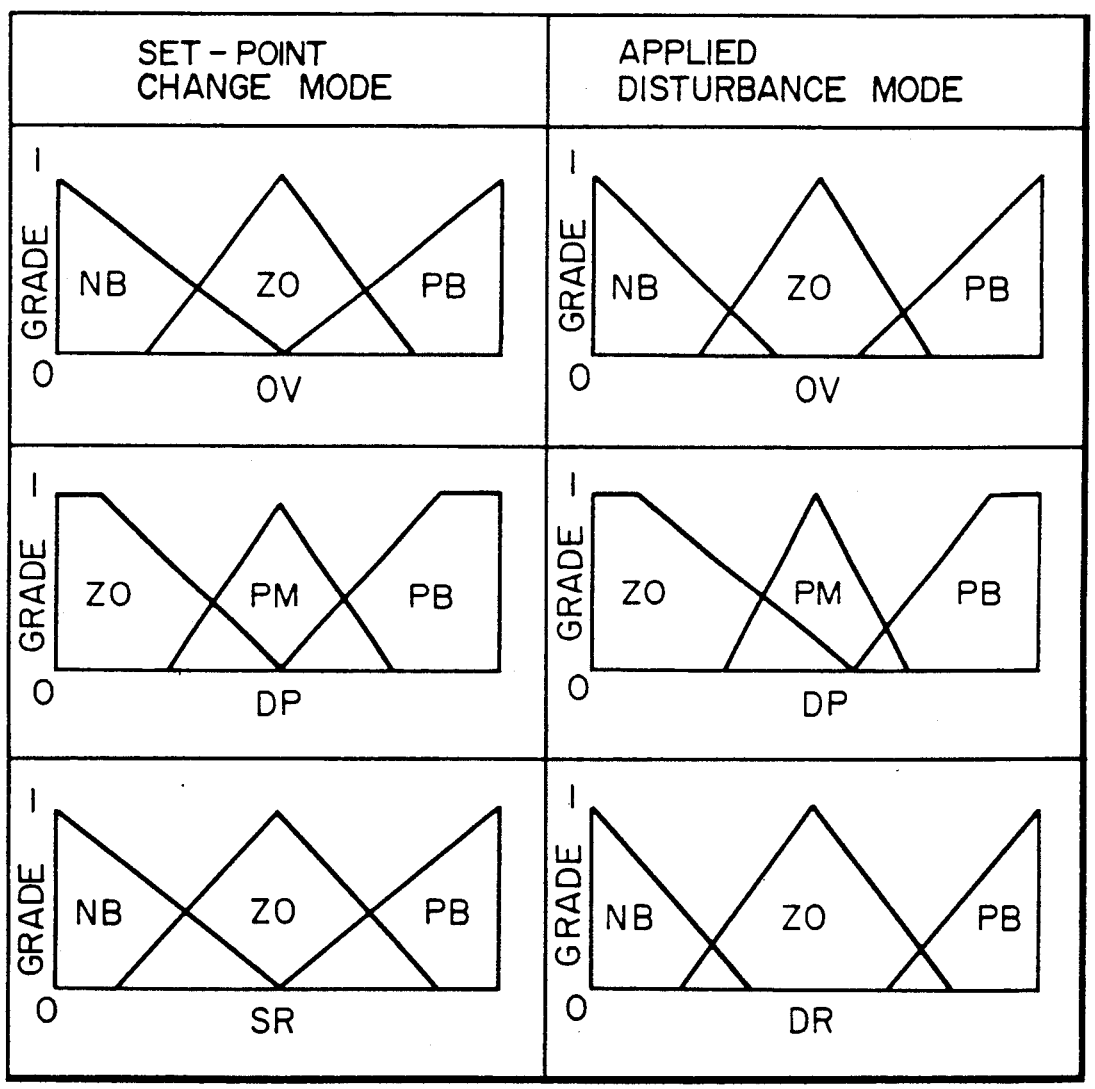
FIG. 4 is a diagram showing an example of membership functions used for fuzzy reasoning in set-point change mode and an applied disturbance mode.

The knowledge processing selector 6 also responds to the mode switchover signal to select the knowledge base for the set-point change or that for the applied disturbance. FIG. 3 exemplifies PID control rules for set-point change stored in the set-point change knowledge base 7 and PID control rules for applied disturbance stored in the disturbance knowledge base 8. FIG. 4 exemplifies membership functions for fuzzy reasoning for set-point change stored in the set-point change knowledge base 7 and fuzzy reasoning membership functions for applied disturbance stored in the disturbance knowledge base 8.

Referring to FIG. 4, when the set point changes, the membership functions for set-point change mode on the left are selected and sent to the fuzzy reasoning unit 9. When the set-point does not change, the membership functions for applied disturbance mode on the right are selected. In this manner, the membership functions for evaluation of characteristic values are set for the different modes in order that even the same error waveform can be evaluated differently depending on whether the occurrence of the error is due to the set-point change or the applied disturbance. In each graphical representation in FIG. 4, the abscissa represents a characteristic value which increases toward the right and the ordinate represents a grade normalized to indicate in terms of values ranging from 0 to 1 how much the characteristic value is correlated to respective membership functions. The membership functions are named after control rules NB, ZO, PB and PM shown in FIG. 3. At a measured characteristic value OV, DP, SR or DR on an abscissa, a grade of the corresponding membership function is determined. Since the shape of the function for set-point change mode is analogous to that of the function for applied disturbance mode, the common function is prepared and adapted for either one of the modes by changing constants. The constants have been stored in the knowledge base and when the set-point change mode is selected, constants associated with the membership functions on the left in FIG. 4 are sent to the fuzzy reasoning unit 9 before the knowledge base is accessed.

Returning to FIG. 3, control rules shown therein are recorded in the form of conditional statements such as,

"IF OV=PB, DP=PB, SR=PB THEN CPR=UP, $CT_I$=UP, $CT_D$=DW"

having the meaning that if the overshoot amount is large, the amplitude damping ratio is also large and the settling time ratio is also large, the proportional band PR must be increased, the integration time $T_I$ must be increased and the differential time $T_D$ must be decreased. In FIG. 3, language variable PB (positive big) represents "large", NB (negative big) represents "small", ZO represents "proper", UP represents "increase", DW represents "decrease" and NC represents "Do not change". Denoted by CPR, $CT_I$ and $CT_D$ are modifying coefficients of the proportional band integration time and differential time, respectively. The instructions UP, DW and NC are determined by skilled control engineers or through simulation. The PID control rules and membership functions may sometimes be determined differently by different skilled control engineers.

Figure 5:
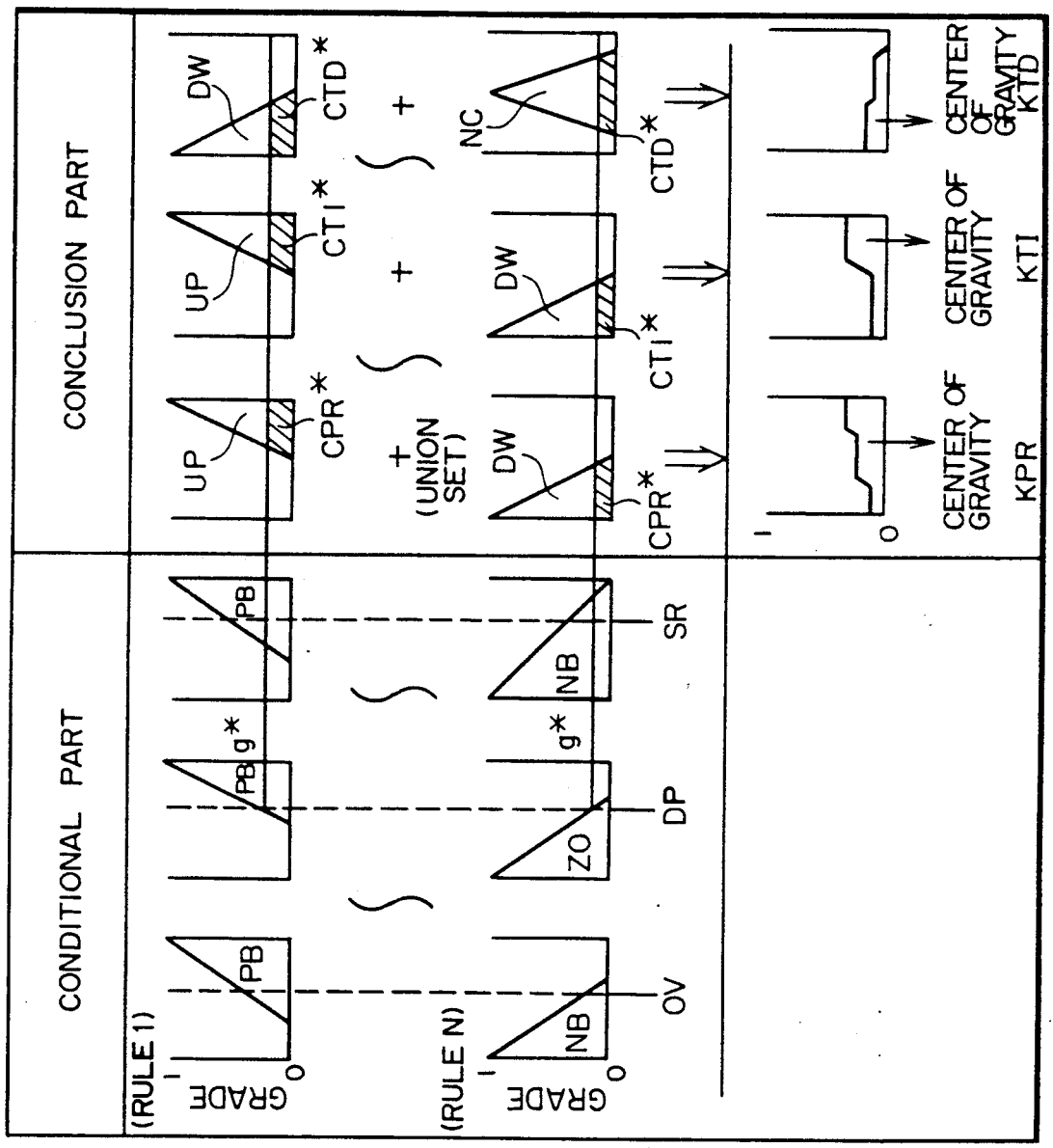
FIG. 5 is a diagram showing the procedure for determining modifying coefficients of PID constants through fuzzy reasoning.

On the basis of the determined feature parameters and knowledge base, the fuzzy reasoning unit 9 settles PID constants. Used for fuzzy reasoning is an algorithm described in "Application of fuzzy algorithms for control of simple dynamic plant" by E.H. Mamdani, PROC. IEEE, Vol. 121, No. 12, DECEMBER 1974, which is hereby incorporated by reference. The fuzzy reasoning procedure is shown in FIG. 5. In a fuzzy set of elements OV, DP and SP or DR, grades of respective lements are determined on the basis of the settled characteristic values and the least of individual grades is determined as g*. Then, in a fuzzy set of elements CPR, $CT_I$ and $CT_D$, the g* is compared with membership functions respectively associated with the elements CPR, $CT_I$ and $CT_D$ and a fuzzy set of elements CPR*, $CT_I$* and $CT_D$*, as indicated by hatching, is selected in which each element has a grade smaller than g*. It depends on each PID control rule what fuzzy set is selected. Elements CPR*, $CT_I$* and $CT_D$* collected from individual PID control rules are respectively added together to obtain a union set of elements $\overline{CPR}$, $\overline{CT_I}$ and $\overline{Ct_D}$. Then, the center of gravity of each element $\overline{CPR}$, $\overline{CT_I}$ or $\overline{Ct_D}$ is calculated which is used as modifying coefficient KPR, $KT_I$ or $KT_D$ for the PID constants. The current PID constants are multiplied by the thus determined modifying coefficients to provide new PID constants, as indicated by the following equations (7), (8) and (9):

$$PR(N) = KPR \times PR(N-1) \quad (7)$$

$$T_I(N) = KT_I \times T_I(N-1) \quad (8)$$

$$T_D(N) = KT_D \times T_D(N-1) \quad (9)$$

where PR(N), $T_I(N)$ and $T_D(N)$ are the newly set PID constants and PR(N−1), $T_I(N-1)$ and $T_D(N-1)$ are the current PID constants. Alternatively, the above reasoning may be realized using a hybrid IC. By increasing the number of types of mode switchover signals and the number of knowledge bases correspondingly, for example, by increasing the number of types of the step-like or ramp-like set point change, finer setting of PID constants can be insured.

Figure 6:
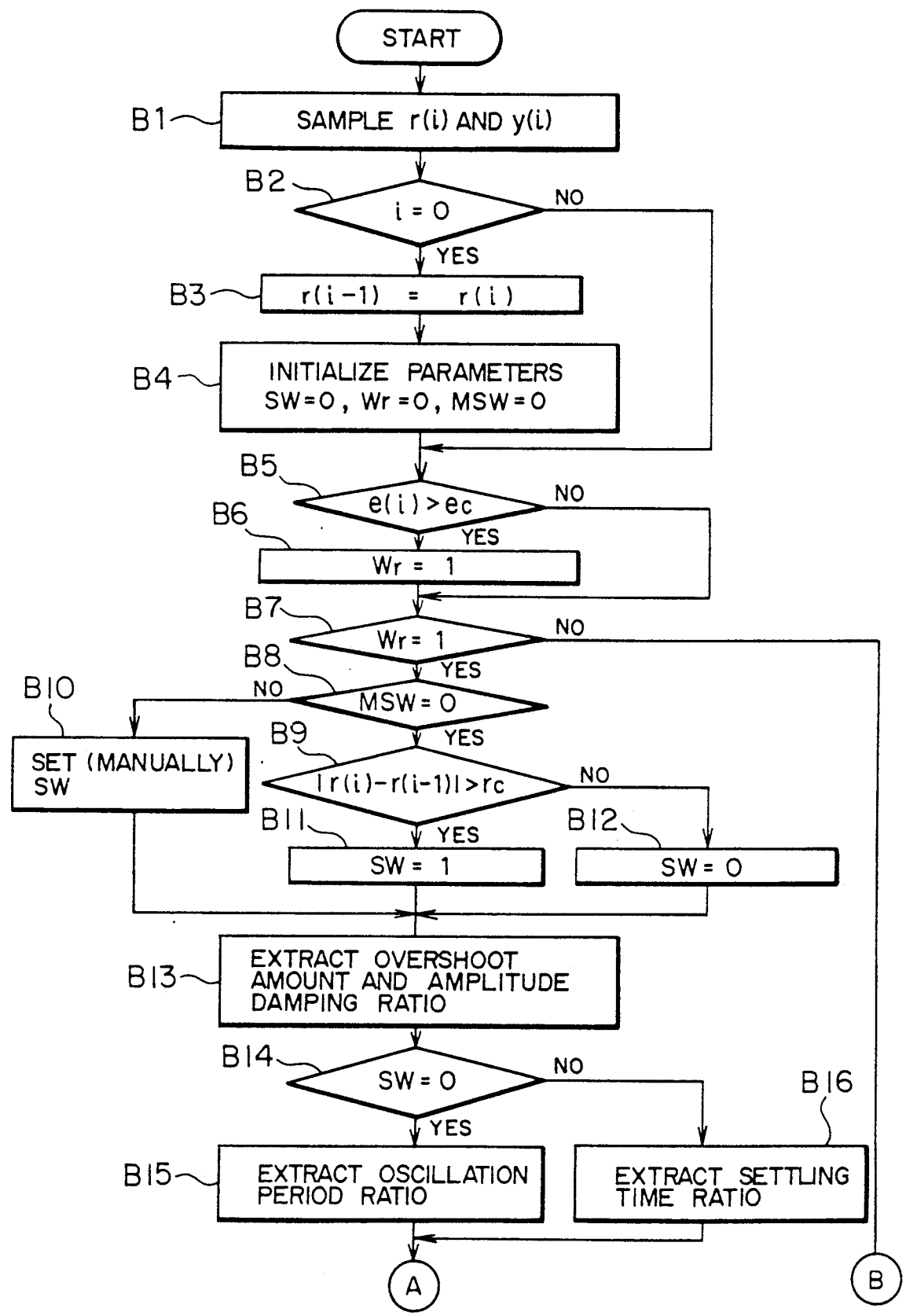
FIGS. 6 and 7 show a flow chart useful to explain the operation of the FIG. 1 embodiment.
Figure 7:
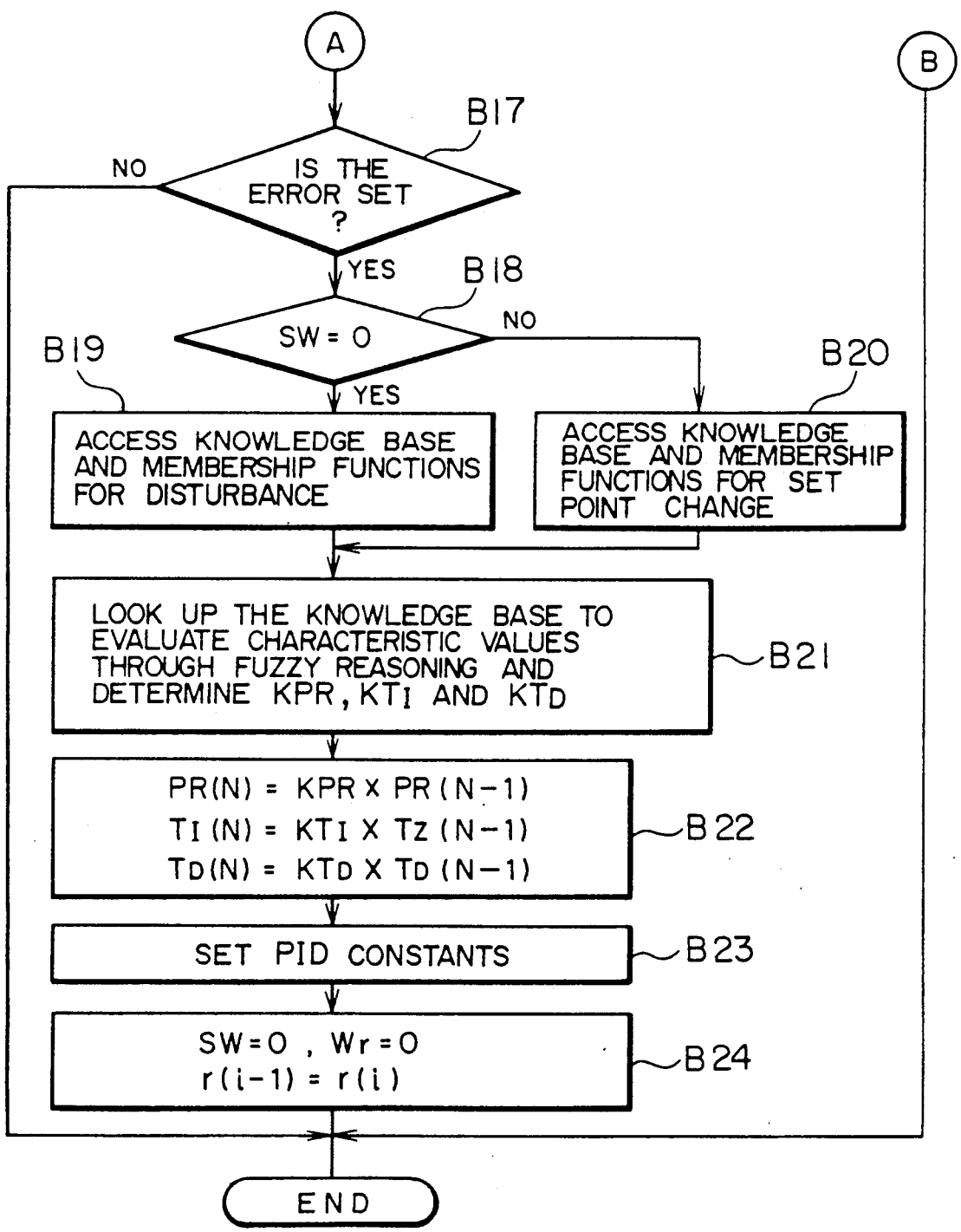

FIGS. 6 and 7 show a flow of procedure executed by the auto-tuning PID controller of FIG. 1 during one sampling. The auto-tuning operation will now be described by referring to the procedure flow.

When auto-tuning is started, the controller 11 samples a set point r(i) and a controlled value y(i) through an A/D converter (step B1). Initiation of autotuning can be done by turning on an auto-tuning start switch provided for the controller. When the start switch is turned on, the sampling time i is set to zero (step B2) and at the time that i=0 is set, a set point r(i−1) for the time i−1, i.e., (−1) time is turned into r(i) (step B3) to thereby initialize variables (internal flags) concerning the auto-tuning (step B4). Of the variables, variables SW and MSW are related to the decider 4. The MSW is particularly associated with the automatic/manual switchover switch for deciding whether the mode is switched to either one of the set-point change and applied disturbance modes automatically or manually. For MSW=0, automatic switching is selected and for MSW=1, manual switching is selected. The SW is then used for determining either one of the set-point change and applied disturbance modes and "0" or "1" of the SW is automatically set in the case of the automatic switchover. For SW=0, the applied disturbance mode is selected and for SW=1, the set-point change mode is selected. In the manual switchover, setting of the SW must be carried out concurrently with setting of the MSW to "1". Variable Wr represents waveform observation start status. Waveform observation is not performed for Wr=0 but is started at the time that Wr=1 is set. After i=1, initialization of parameters will not be carried out.

An error $e(i) = r(i) - y(i)$ is determined from the set point r(i) and controlled value y(i) and sent to the decider 4 and characteristic value extractor 2. The decider 4 decides every period whether the error e(i) exceeds a predetermined value $e_c$ set externally of the controller (step B5). If the e(i) exceeds the $e_c$, the waveform observation status variable Wr is set to "1" (step B6). After completion of waveform observation, the Wr is reset to "0" as will be described later. The decider 4 decides whether the Wr is "1" or "0" (step B7) and if Wr=1, it then decides whether the variable MSW associated with the automatic/manual switchover switch is "0" (step B8). If MSW=0 stands indicating the automatic mode, the following decision is made in step B9 in order for automatic setting of the variable SW to be effected. More particularly, in the step B9, the difference between the current sampling value r(i) and previous sampling value r(i−1) is calculated and its absolute value is decided as to whether to exceed a predetermined value $r_c$, so as to detect a change in set point. If the absolute value exceeds the $r_c$, the procedure proceeds to step B11 in which SW=1 (set pount change mode) is set and if the absolute value does not exceed the $r_c$, the procedure proceeds to step B12 in which SW=0 (disturbance mode) remains unchanged. It is to be noted that setting of the SW is carried out by the decider 4.

At the time that Wr=1 is set, the characteristic value extractor 2 and characteristic value selector are started to operate so that the error e(i) may be handled in steps B13, B14, B15 and B16. In particular, in the step B14, the characteristic value selector 5 selects characteristic value which are to be determined in accordance with the value of the SW.

In step B17, the decider 4 is also operable to decide whether the error e(i) is set. The error e(i) is decided as being set by the fact that it stays within a predetermined range for a predetermined time. If setting of the e(i) is determined, the fuzzy reasoning processing is carried out in step B18 and ensuing steps. If setting of the e(i) is not determined, waveform observation continues.

After the decision on the error setting is settled, the knowledge processing selector 6 sends the knowledge base and constants of membership functions to the fuzzy reasoning unit 9 in accordance with the value of the SW. More particularly, if SW=0 is decided in step B18, the contents for disturbance is accessed and fed to the unit 9 (step B19) and if SW=1 is decided in step B18, the contents for set-point change is accessed and fed to the unit 9 (step B20). The fuzzy reasoning unit 9 looks up the knowledge base to evaluate characteristic values through fuzzy reasoning and determines modifying coefficients $KP_R$, $KT_I$ and $KT_D$ for the PID constants (step B21). Then, the fuzzy reasoning unit 9 multiplies the current PID constants by the determined modifying coefficients (step B22) to provide new PID constants and it sets the new PID constants in the PID action 1 (step B23). After the settlement of the PID constants, the waveform observation status variable Wr is set to "0", the variable SW is set to "0" and the current set point r(i) is set in r(i−1) (step B24, thus completing the waveform observation and derivation of PID constants. Resetting and updating of parameters in the step B24 is carried out by means of the fuzzy reasoning unit 9.

In an alternative, the PID controller operable as described above may be realized using a microcomputer.

Referring to FIG. 8, there is illustrated another embodiment of the auto-tuning PID controller according to the invention.

In the previous embodiment of FIG. 1, the characteristic value extractor 2 extracts as characteristic values the overshoot amount OV, amplitude damping ratio DP, oscillation period ratio DR and settling time ratio SR, and the characteristic value selector 5 responsive to the mode switchover signal selects delivers as characteristic values the overshoot amount OV, amplitude damping ratio DP and settling time ratio SR during the set-point change mode and delivers the overshoot amount OV, amplitude damping ratio DP and oscillation period ratio DR during the applied disturbance mode. In the second embodiment of FIG. 8, however, the number of peaks (peak number) is used in place of the settling time ratio SR and oscillation period ratio DR. Since in this embodiment PID constants are set using the same characteristic values irrespective of the modes of set-point change and applied disturbance, the characteristic value selector 5 required in the FIG. 1 embodiment can be dispensed with. Thus, in accordance with the FIG. 8 embodiment, a characteristic value extractor 2 extracts the overshoot amount OV, amplitude damping ratio DP and peak number as characteristic values which are delivered directly to the fuzzy reasoning unit 9.

Except for the above, the construction of this embodiment is identical to that of the FIG. 1 embodiment and will not be described herein.

As described above, in accordance with the embodiments of the invention, the decider 4 is provided for deciding which mode of set-point change or applied disturbance and PID constants can be set to proper values for either one of the set-point change and disturbance suppression on the basis Of results of decision.

Advantageously, the present invention can materialize the auto-tuning controller which can control the process such that proper control response can be obtained from the process during the set-point change and the applied disturbance or process characteristic change.

We claim:

1. A method of automatically setting PID constants used for process control comprising the steps of:

extracting characteristic values representative of controllability for a process from an error between a set point for said process and a control value therefrom;

deciding whether a control response generated at said process is due to a change in set point or due to a disturbance applied to said process; and determining PID constants on the basis of said characteristic values and results of the decision;

wherein said PID-constant determining step comprises the steps of taking out of knowledge base means for storing rules and functions PID control rules and membership function for fuzzy reasoning, and determining the PID constants on the basis of the taken-out PID control rules and fuzzy reasoning membership functions; and wherein said knowledge base means comprises a first knowledge base for storing PID control rules and fuzzy reasoning membership functions adapted for set point change and a second knowledge base for storing PID control rules and fuzzy reasoning membership functions adapted for applied disturbance, and said PID-constant determining step comprises the step of selecting either one of said first and second knowledge bases in accordance with the results of the decision in said deciding step.

2. An auto-tuning PID controller for process control comprising:

means for extracting charcteristic values representative of controllability for a process from an error between a set point for said process and a value therefrom;

means for deciding whether a control response generated at said process is due to a change in the set point or due to a disturbance applied; and means for determining PID constants on the basis of said characteristic values and results of the decision;

wherein said PID-constant determining means comprises knowledge base means for storing information including PID control rules and the membership functions for fuzzy reasoning, and fuzzy reasoning means for determining the PID constants on the basis of said information; and wherein said knowledge base means comprises a first knowledge base for storing information including PID control rules and fuzzy reasoning membership functions which are to be used when the set point change occurs, and a seocnd knowledge base for storing information including PID cotnrol rules and fuzzy reasoning membership functions which are to be used when the disturbance is applied.

3. The auto-tuning PID controller according to calim 2, wherein said PID-constant determining means comprises means responsive to an output signal of said deciding means to select either one of said first and second knowledge bases.

4. The auto-tuning controller for process control comprising:

means for extracting characteristic values representative of controllability for a process from an error between a set point for said process and a value therefrom;

means for deciding whether a control response generated at said process is due to a change in the set point or due to a disturbance applied; and means for determining PID constants on the basis of said characteristic values and results of the decision;

wherein said deciding means comprises means operable manually to permit the process control to be set in a set point change mode or an applied disturbance mode.

5. An auto-tuning PID controller operable to determine, from a control response from a process, characteristic values representative of controllability for said process based on PID constants currently set and to automatically derive and set new PID constants from the determined characteristic values, said controller comprising:

means for extracting characteristic values representative of controllability from an error between a set point for said process and a control value therefrom;

means for deciding whether a control response from said process is due to a change in set point or due to a disturbance applied; and PID-constant determining means for deriving PID constants on the basis of said characteristic values, said determining means including a first determining unit for determining PID constants corresponding to the set point change, a second determining unit for determining PID constants corresponding to the applied disturbance, and means for selecting either one of the first and second determining units on the basis of results of the decision from said deciding means;

wherein said extracting means comprises means for extracting from a waveform of said error an overshoot amount, an amplitude damping ratio and an oscillation period ratio or a settling time ratio, and said PID-constant determining means comprises means for deriving said PID constants from said characteristic values through fuzzy reasoning.

6. An auto-tuning PID controller for process control comprising:

means for extracting characteristic values representative of controllability for a process from an error between a set point fo said process and a controlled value therefrom, means for detecting a change in the set point in order to calculate a change width of the set point and to decide whether a control response generated at said process is due to a change in the set point or due to a disturbance applied; and means for determining PID constants on the basis of said characteristic values and results of the decision.

7. The auto-tuning PID controller according to claim 6, wherein said PID-constant determining means comprises knowledge base means for storing information including PID control rules and membership functions for fuzzy reasoning, and fuzzy resoning means for determining the PID constants on the basis of said information.

8. The auto-tuning PID controller according to claim 7, wherein said knowledge base means comprises a first knowledge base for storing information including PID control rules and fuzzy reasoning membership functions which are to be used when the change in set point occurs, and a second knowledge base for storing information including PID control rules and fuzzy reasoning membership functions which are to be used when the disturbance is applied.

9. The auto-tuning PID controller according to claim 8, wherein said PID-constant determining means comprises means responsive to an output signal of said deciding means to select either one of said first and second knowledge bases.

10. The auto-tuning PID controller according to claim 6, wherein said detecting means comprises means operable manually to permit the process control to be set in a set-point change mode or an applied disturbance mode.

11. The atuo-tuning PID controller according to claim 6, wherein said characteristic value extracting means comprises means for extracting both a set of characteristic values suitable for controlling a response due to the change in set point and a set of characteristic values suitable for controlling a response due to the disturbance, and means responsive to an output signal of said detecting means to select either one of said two sets of characteristic values.

12. The auto-tuning PID controller according to claim 6, wherein said characteristic value extracting means comprises means for extracting characteristic values effective to control responses due to both the change in set-point and the applied disturbance.

13. The auto-tuning PID controller according to claim 6, wherein said detecting means comprises means for detecting whether said set point for said process is changed, and means for deciding whether said error exceeds a predetermined value, whereby when said error exceeds said predetermined value and the change in set point is detected, the occurrence of said error is decided to be due to the set point change and when said error exceeds said predetermined value and the change in set point is not detected, the occurrence of said error is decided to be due to the disturbance applied.

14. The auto-tuning PID controller according to claim 6, wherein said detecting means directly detects the change in the set point to decide whether the control response generated at said process is due to a change in the set point or due to a disturbance applied.

15. An auto-tuning PID controller operable to determine, from a control response from a process, characteristic values representative of controllability for said process based on PID constants currently set and to automatically derive and set new PID constants from the determined characteristic values, said controller comprising:
means for extracting characteristic values representative of controllability from an error between a set point for said process and a controlled value therefrom;
means for detecting a change in the set point in order to calculate a change width of the set point and to decide whether a control response from said process is due to a change in set point or due to a disturbance applied; and
PID-constant determining means for deriving PID constants on the basis of said characteristic values, said determining means including a first determining unit for determining PID constants corresponding to the set point change, a second determining unit for determining PID constants corresponding to the applied disturbance, and means for selecting either one of the first and second determining units on the basis of results of the decision from said detecting means.

16. The auto-tuning PID controller according to claim 15, wherein said extracting means comprises means for extracting from a waveform of said error an overshoot amount, an amplitude damping ratio and an oscillation period ratio or a settling time ratio, and said PID constant determining means comprises means for deriving said PID constants from said characteristic values through fuzzy reasoning.

17. The auto-tuning PID controller according to claim 15, wherein said extracting means comprises means for extracting from a waveform of said error an overshoot amount, an amplitude damping ratio and a rise time.

18. The auto-tuning PID controller according to claim 15, wherein said detecting means directly detects the change in the set point to decide whether the control response from said process is due to a change in the set point or due to a disturbance applied.

19. An auto-tuning PID controller for process control comprising:
means for extracting characteristic values representative of controllability for a process from an error between a set point for said process and a controlled value therefrom,
means for detecting a change in set point in order to calculate a change width of the set point and to decide whether a control response generated at said process is due to a change in set point or due to a disturbance applied;
means for determining PID constants on the basis of said characteristic values and results of the decision; and
means for calculating a manipulated value for said process on the basis of said PID constants.

20. The auto-timing PID controller according to claim 19, wherein said detecting means directly detects the change in the set point to decide whether the control response generated at said process is due to a change in the set point or due to the disturbance applied.

21. A method of automatically setting PID constants used for process control comprising the steps of:
extracting characteristic values representative of controllability for a process from an error between a set point for said process and a controlled value therefrom;
detecting a change in the set point in order to calculate a change width of the set point and to decide whether a control response generated at said process is due to a change in the set point or due to a disturbance applied to said process; and determining PID constants on the basis of said characteristic values and results of the decision.

22. The setting method according to claim 21, wherein said PID-constant determining step comprises the steps of taking out of knowledge base means for storing rules and functions PID control rules and membership functions for fuzzy reasoning, and determining the PID constants on the basis of the taken-out PID control rules and fuzzy reasoning membership functions.

23. The setting method according to claim 22, wherein said knowledge base means comprises a first knowledge base for storing PID control rules and fuzzy reasoning membership functions adapted for set-point change and a second knowledge base for storing PID control rules and fuzzy reasoning membership functions adapted for applied disturbance, and said PID-constant determining step comprises the step of selecting either one of said first and second knowledge bases in accordance with the results of the decision in said deciding step.

24. The setting method according to claim 21, wherein said characteristic value extracting step comprises the step of extracting one set of characteristic values suitable for controlling a response due to the change in set point and another set of characteristic values suitable for controlling a response due to the disturbance, and said PID-constant determining step comprises the step of selecting either one of said two sets of characteristic values in accordance with the results of the decision in said detecting step.

25. The setting method according to claim 21, wherein said detecting step comprises the steps of deciding whether said error exceeds a predetermined value, detecting, when it is decided that said error exceeds said predetermined value, whether said set point for said process is changed, and determining, on the basis of the decision and detection results, whether the occurrence of said error is due to the change in set point or due to the disturbance.

26. The setting method according to claim 21, wherein said detecting step includes directly detecting the change in the set point to decide whether the control response generated at said process is due to a change in the set point or due to a disturbance applied to said process.

27. An auto-tuning PID controller operable to determine, from a control response from a process, characteristic values representative of controllability for said process based on PID constants currently set and to automatically derive and set new PID constants from the determined characteristic values, said controller comprising:
means for extracting characteristic values representative of controllability from an error between a set point for said process and a control value therefrom;
means for deciding whether a control response from said process is due to a change in set point or due to a disturbance applied; and
PID-constant determining menas for deriving PID constants on the basis of said characteristic values, said determining means including a first determining unit for determining PID constants corresponding to the set point change, a second determining unit for determining PID constants corresponding to the applied disturbance, and means for selecting either one of the first and second determining units on the basis of results of the decision from said deciding means;
wherein said extracting means comprises means for extracting from a waveform for said error an overshoot amount, an amplitude damping ratio and a rise time.

* * * * *